(12) United States Patent
Shi et al.

(10) Patent No.: US 12,313,447 B2
(45) Date of Patent: May 27, 2025

(54) SYSTEMS AND METHODS FOR CONTACTLESS POWER CONVERTER AGING DETECTION

(71) Applicant: THE FLORIDA STATE UNIVERSITY RESEARCH FOUNDATION, INC., Tallahassee, FL (US)

(72) Inventors: Yanjun Shi, Tallahassee, FL (US); Xiuwen Liu, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 421 days.

(21) Appl. No.: 17/813,827

(22) Filed: Jul. 20, 2022

(65) Prior Publication Data

US 2023/0027359 A1    Jan. 26, 2023

Related U.S. Application Data (60) Provisional application No. 63/225,920, filed on Jul. 26, 2021.

(51) Int. Cl.
*G01H 3/08*    (2006.01)
*H04R 1/08*    (2006.01)

(52) U.S. Cl.
CPC ............. *G01H 3/08* (2013.01); *H04R 1/08* (2013.01)

(58) Field of Classification Search
CPC ............. G01H 3/08; H04R 1/08; H04R 1/028
See application file for complete search history.

(56) References Cited

U.S. PATENT DOCUMENTS

2020/0408829 A1* 12/2020 Ugur .................. G01R 31/2621

FOREIGN PATENT DOCUMENTS

| CN | 106612094 | * | 5/2017 | ............. G06N 3/084 |
| CN | 110741266 | * | 1/2020 | ........... G01R 31/327 |
| JP | 2019161966 | * | 9/2019 | ................ H02J 9/06 |
| KR | 20090023051 | * | 3/2009 | ......... G05B 23/0283 |

OTHER PUBLICATIONS

Standards on Noise Measurements, Nbs Special Publication 386, U.S. Department of Commerce / National Bureau of Standards, 1976, 76 pages.*

(Continued)

*Primary Examiner* — Alexander Satanovsky
(74) *Attorney, Agent, or Firm* — Eversheds Sutherland (US) LLP (57) ABSTRACT

Systems, methods, and computer-readable media are disclosed for contactless power converter aging detection. An example method may include receiving, from a microphone, first acoustic data associated with a power converter. The example method may also include converting the first acoustic data into second acoustic data, wherein the first acoustic data is time domain data and the second acoustic data is frequency domain data. The example method may also include determining, by a machine learning model and based on the second acoustic data, a remaining useful life value associated with the power converter.

17 Claims, 4 Drawing Sheets

(56) References Cited

OTHER PUBLICATIONS

Jaspreet Kaur Mann, "Aging Detection Capability for Switch-Mode Power Converters", IEEE Transactions on Industrial Electronics, vol. 63, Issue: 5, pp. 3216-3227.*

Gorazd Tumberger et al., "Acoustic noise emissions caused by the transformer in a DC/DC converter for welding applications", Przegld Elektrotechniczny, ISSN 0033-2097, R. 89 NR 2b/2013, pp. 88-91.*

* cited by examiner

SYSTEMS AND METHODS FOR CONTACTLESS POWER CONVERTER AGING DETECTION

CROSS-REFERENCE TO RELATED PATENT APPLICATION

The present application is related to and claims priority from Application No. 63/225,920 filed on Jul. 26, 2021 titled "SYSTEMS AND METHODS FOR CONTACTLESS POWER CONVERTER AGING DETECTION."

BACKGROUND

Over 70% of electrical energy in the U.S. flows through power electronics. In many applications, the reliability of a power electronics converter is a top priority, as the failure of a power converter can potentially result in severe damage to a power system. Power switching devices have been reported as the most frequently failing components in power converters. Therefore, it is important to detect or predict the aging of power devices before a failure occurs.

In current engineering practice, the aging of such power devices is performed through offline predictions, and the failure of power converters is typically prevented through scheduled maintenance of the power converter. However, the actual lifetime of power devices is highly sensitive to factors such as real-world mission profiles and lifetime models.

Some online aging detection methods exist; however, such methods are typically based on identifying aging precursors. On state voltage drop ($V_{ce,ON}$) is a commonly used precursor for insulated-gate bipolar transistors (IGBTs). Reflectometry-based methods are used for detecting gate impedance or on resistance variation and may involve injecting a pseudo-noise signal on top of gate voltage. Gate threshold voltage variation can be used for detecting all the gate-oxide induced failures by measuring the gate voltage or gate leakage current.

All these aforementioned methods require inserting an additional circuit close to each power switch. They are reliable only if the inserted circuit remains healthy over the lifetime of the converter. In many cases, the failure of detection circuitry can cause a short circuit to the main switch. That is, the use of the circuit to perform the remaining lifetime determinations may cause damage to the power converter. Additionally, on-site calibrations are usually required to prevent false triggering caused by electromagnetic noise.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element, or a component may encompass a plural number of such elements or components and vice versa.

DETAILED DESCRIPTION

This disclosure relates to, among other things, systems and methods for contactless power converter aging detection. More particularly, the systems and methods may allow for aging detection to be performed online, in-situ, and non destructively. In some instances, the systems and methods described herein may specifically be applied to power electronics converters, especially power converters using wide bandgap (WBG) devices. However, the systems and methods may also be applied in any other context and to any other type of device as well.

The method may involve measuring the acoustic noise near an operating power converter and predicting the remaining useful lifetime of the converter based on the acoustic noise. The acoustic noise being measured may be generated by the switching events of power semiconductors associated with the power converter. Particularly, the acoustic noise may be generated by the mechanical vibration caused by Lorentz force on the conductors and the magnetostrictive force on magnetic cores. The Lorentz force may generally be defined as the force exerted on a charged particle "q" moving with velocity "v" through an electric field "E" and magnetic field "B," with the relationship being $F=qE+qv \times B$.

Compared with current aging detection or failure detection methods, the method described herein does not require inserting a specially designed detection circuit near the power switches. This provides a great benefit as the switches of a commercial power converter are often inaccessible, and thus it may not be possible or practical to insert such a detection circuit. In addition, an intermediate result of the methods described herein may include reconstructing the terminal voltage/current (V/I) spectrum of a power electronics converter from its acoustic noise spectrum. These systems and methods may thus be extended to other applications that utilize the terminal voltage/current spectrum analyses.

In some embodiments, the contactless power converter aging detection method as described herein may be based on the following physical phenomenon. First, the gate-oxide degradation of an aged power semiconductor may cause variations in its gate threshold voltage. Such gate threshold voltage variations may cause distortions in the voltage/current spectrum, both in switching frequency sidebands and dv/dt frequency range. Finally, when there is high-frequency current flowing through conductors, acoustic noise may be generated which may be detected by a microphone. Therefore, by analyzing the sound generated by the switching of the converter, it is possible to detect the degradation of the power switches and predict their remaining lifetime. In some cases, the "sound" may be ultrasound (for example, the sound may be ultrasound for higher switching frequency systems). However, any other frequency of sound may also be applicable as well.

In some embodiments, the method may generally involve the following operations. The acoustic noise of an operating converter may be collected by a microphone (or any other type of device capable of capturing audio data). The microphone may be placed at any distance from the power converter, as well as at any angle. Acoustic data may also be collected at various ranges and/or various angles as well. Additionally, multiple microphones may be used. In such cases, the multiple microphones may also be placed at various distances from the power converter and/or angles with respect to the power converter. The microphone may be any type of microphone, such as a standalone microphone, or a microphone integrated into a device, such as a smartphone or other mobile device. The noise waveform (which may include data in the time domain) may be filtered to remove environmental noise and may be transformed into an acoustic switching noise spectrum (which may be in the frequency domain). The acoustic measurements may also be ultrasonic to mitigate the need to filter out any ambient noise in the environment.

Once the acoustic data is collected by the microphone, the data may be converted from the time domain to the frequency domain using a Fast Fourier Transform (FFT), or any other suitable method. The switching noise spectrum may be processed by a computer program, which may be trained by supervised machine learning, to generate an electric spectrum (for example, a spectrum including voltage and/or current data instead of the frequency domain data included in the acoustic switching noise spectrum). This collected electric spectrum (which may also be referred to as a "V/I spectrum") may then be compared with an ideal electric spectrum to calculate a variation between a gate threshold voltage ($\Delta V_{th}$) associated with the collected electric spectrum and the ideal electric spectrum. The remaining useful lifetime of the power converter may then be determined through any variations that are identified through the comparison.

In some embodiments, the machine learning model may be trained to be able to more effectively produce a remaining useful life output for any given input acoustic data. For example, such training may involve, when acoustic data is captured and provided to the machine learning model, providing the machine learning model with V/I spectrum data captured directly from the power converter. This data may be captured, for example, using a spectrum analyzer. This captured V/I spectrum data may be used in conjunction with the acoustic data to adjust the model so that the model may be able to more accurately produce V/I spectrum data given an acoustic switching noise spectrum. That is, the captured V/I spectrum data may provide a reference point for what the V/I spectrum data should be for any given acoustic data. In this regard, the machine learning model may be improved so that it is able to produce the V/I spectrum for given acoustic measurements without requiring V/I spectrum data to be directly captured (for example, using the spectrum analyzer).

The proposed method may be further separated into two technology levels. Level one technology may utilize the power electronics knowledge to derive $\Delta V_{th}$ from a measured electric spectrum. It may be used independently as a nonintrusive method. Instead of inserting circuits to the gate drivers, the nonintrusive method may only need to measure the terminal V/I waveforms. Level two technology may achieve contactless aging detection. Machine learning may be used to reconstruct the electric spectrum instead of predicting the device lifetime directly, due to the following reasons. First, the number of data points in the training set may significantly influence the performance of machine learning. Training with spectrum data may provide a much larger data set than training with devices at different lifetimes. Second, the derivation from the electric spectrum to gate threshold voltage is a clear process. It is the reverse procedure of calculating switching harmonics distortion with increased deadtime. Also, this procedure may be less influenced by environmental conditions. On the other hand, the procedure from the sound spectrum to the electric spectrum may be highly influenced by environmental variables.

In one or more embodiments, the system may also automatically perform an action with respect to a given power converter based on the analyses performed herein. For example, based on a remaining life determination for a power converter, the system may automatically send a signal to the power converter to shut down the power converter, modify an operational parameter of the power converter, and/or perform any other automated action. Additionally, the system may automatically send an alert to a user. For example, the alert may provide an indication of the remaining useful life of the power converter. The alert may also provide an indication that the remaining useful life of the power converter is below a threshold amount of time and/or may provide any other relevant information to a user. The alert may be any type of alert, such as auditory, visual, etc.

Figure 1:
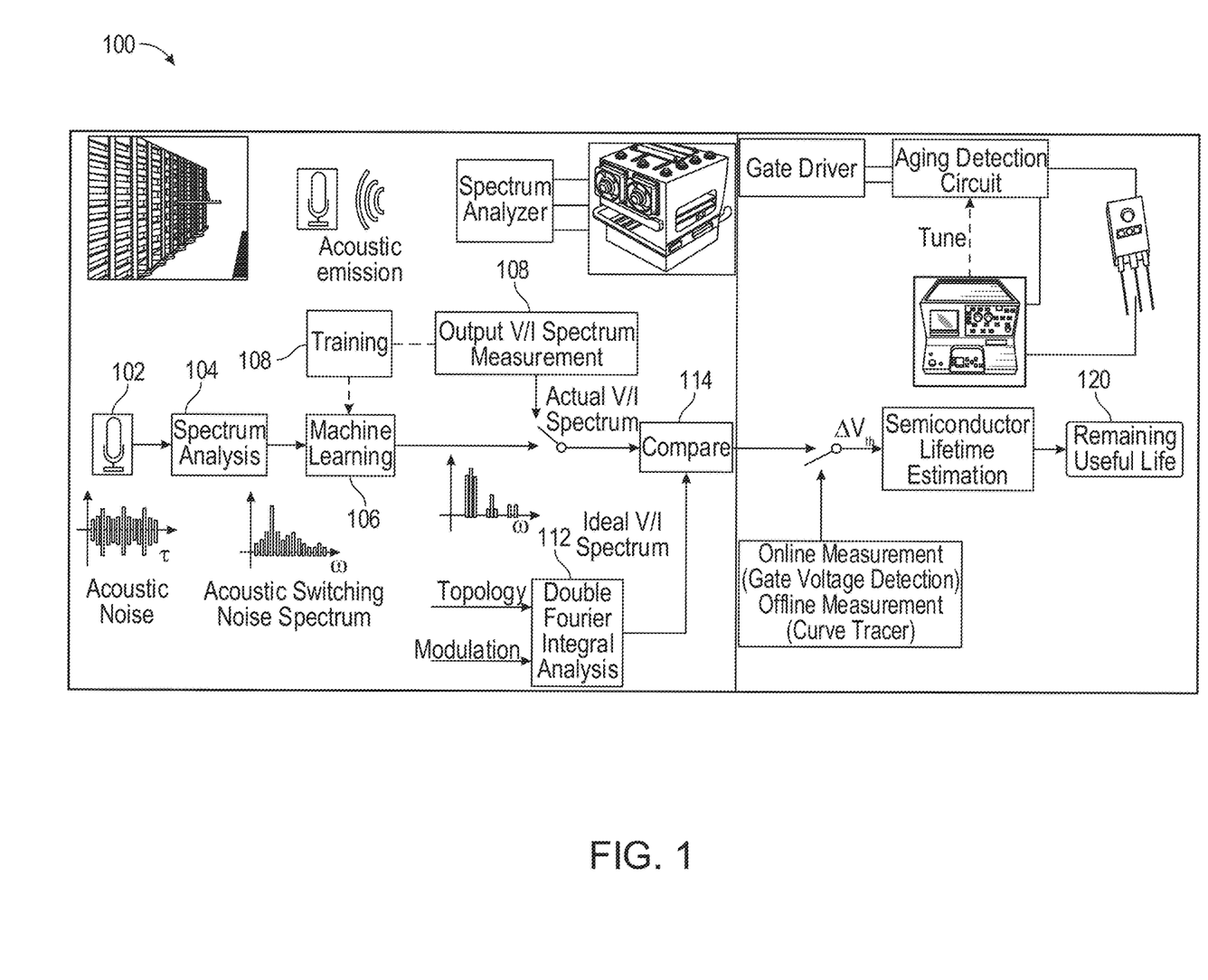
FIG. 1 illustrates an example flow diagram, in accordance with one or more embodiments of the disclosure.

Turning to the figures, FIG. 1 depicts an example flow diagram 100, in accordance with one or more embodiments of the disclosure. The flow diagram 100 illustrates example operations that may be performed in association with the methods for detecting power converter aging as described herein.

The flow diagram begins with operation 102, which may involve receiving acoustic data from an operating power converter. Such data may be collected by a microphone that is placed in proximity of the power converter. As aforementioned, the microphone may be any type of microphone and may be placed at any distance from the power converter. Additionally, multiple data sets may be collected from the power converter at various distances. Furthermore, more than one microphone may also be used to collect such data.

Operation 102 is followed by operation 104, which may involve converting the acoustic data obtained in operation 102 into an acoustic switching noise spectrum. The acoustic switching noise spectrum may be in the frequency domain. The conversion between the acoustic data in the time domain and the acoustic switching noise spectrum in the frequency domain may be performed using a Fast Fourier Transform (FFT) or any other suitable method. In some cases, the conversion between the data in the time domain and the frequency domain may be performed because the time domain data (even within a very short timeframe) may include a significant amount of information in the captured acoustic waveforms. By converting the data into the frequency domain, it may be easier to ascertain the switching frequency of the power converter. For example, the switching frequency may be identified through one or more peaks in the frequency domain data spectrum.

Following operation 104, the flow diagram 100 proceeds to operation 106, which may involve providing the acoustic switching noise spectrum (the frequency domain data) as an input to a machine learning model. The machine learning model may be based on any type of machine learning. In some cases, the ultimate output of the machine learning model may be the remaining useful life of the power converter as indicated in operation 120 of the flow diagram 100. In some cases, the manner in which this remaining useful life is determined may be performed as follows. First, the machine learning model may convert the acoustic switching noise spectrum in the frequency domain into an electric spectrum including voltage and/or current data as aforementioned. This electric spectrum may represent an actual V/I spectrum, which may be a spectrum based on the data obtained from the acoustic measurements. This actual V/I spectrum may be compared to an ideal V/I spectrum that may be produced through operation 112. At operation 114, the actual V/I spectrum and the ideal V/I spectrum may be compared to determine a variation between a gate threshold voltage ($\Delta V_{th}$) associated with the collected electric spectrum and the ideal electric spectrum. Based on this variation between the gate threshold voltage ($\Delta V_{th}$) associated with the collected electric spectrum and the ideal electric spectrum, the remaining useful life of the power converter may be determined. This remaining useful life may be output in the form of a numerical value, a binary value, or any other type of output.

In some embodiments, the flow diagram 100 may also include operations for training the machine learning model to be able to more effectively produce a remaining useful life output based on acoustic data. For example, operation 108 may involve capturing V/I spectrum data directly from the power converter, for example, using a spectrum analyzer. The V/I spectrum data captured in operation 108 may be used to adjust the model so that the model may be able to more accurately produce V/I spectrum data given an acoustic switching noise spectrum.

Figure 2:
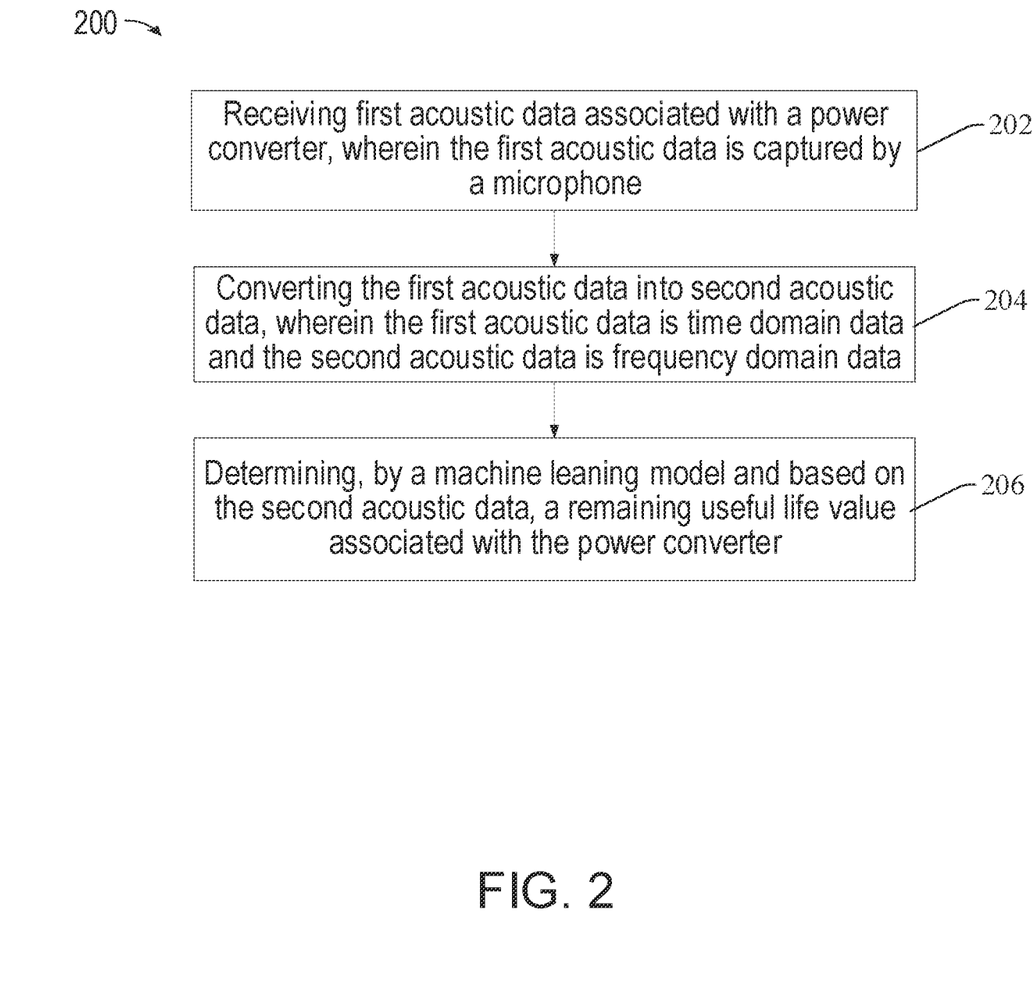
FIG. 2 illustrates an example method, in accordance with one or more embodiments of this disclosure.

FIG. 2 illustrates an example method, in accordance with one or more embodiments of this disclosure. At block 202 of the method 200 in FIG. 2, the method 200 may include receiving first acoustic data associated with a power converter, wherein the first acoustic data is captured by a microphone. At block 204, the method 200 may include converting the first acoustic data into second acoustic data, wherein the first acoustic data is time domain data and the second acoustic data is frequency domain data. At block 206, the method 200 may include determining, by a machine learning model and based on the second acoustic data, a remaining useful life value associated with the power converter.

Figure 3:
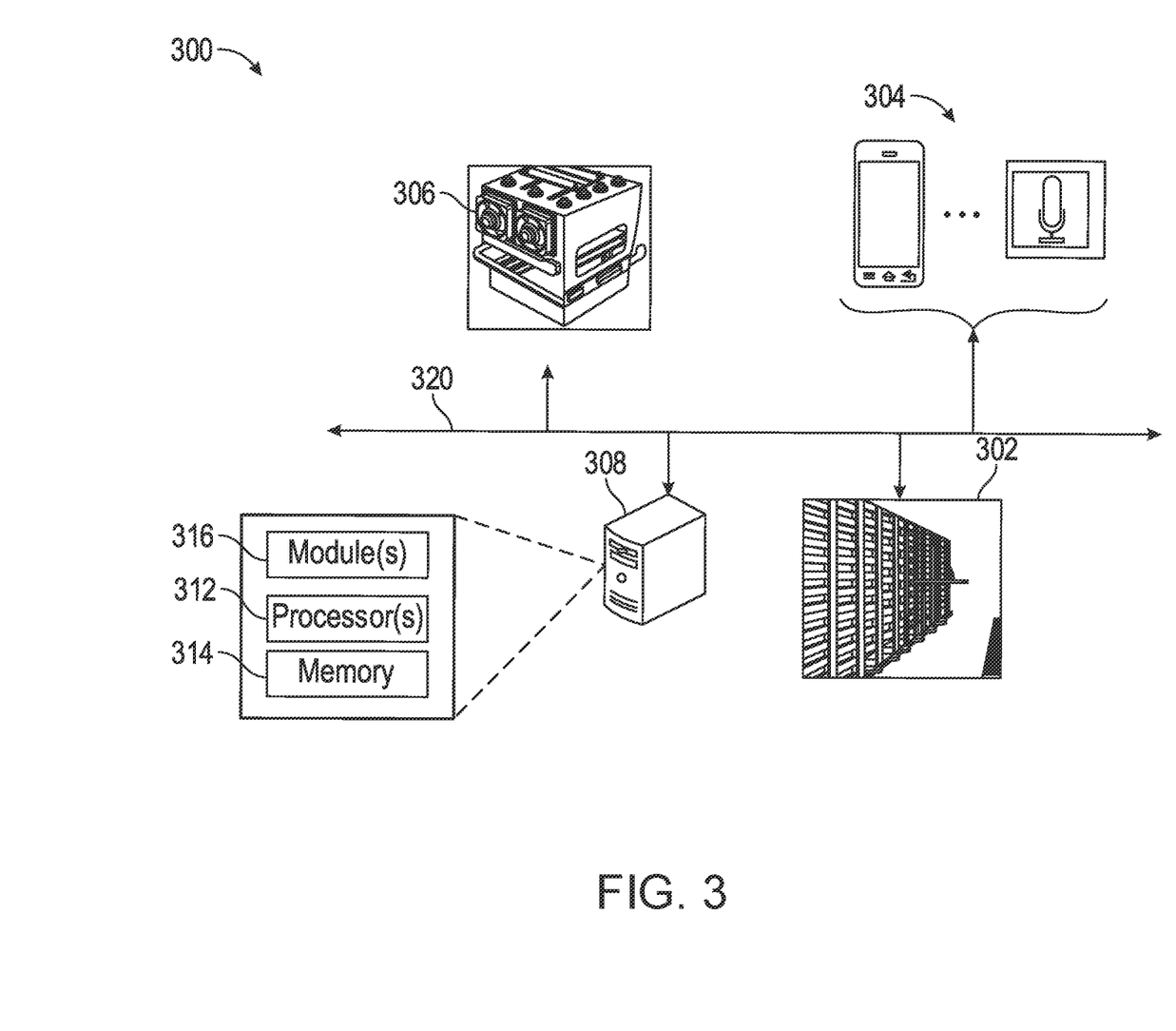
FIG. 3 illustrates an example system, in accordance with one or more embodiments of this disclosure.

FIG. 3 illustrates an example system 300, in accordance with one or more embodiments of this disclosure.

In one or more embodiments, the system 300 may include at least one or more power converters 302, one or more microphones 304, one or more spectrum analyzers 306, and/or one or more computing devices 308. However, the system 300 may also include any other number of components and/or types of components as well. For convenience, reference may be made hereinafter to a single power converter, microphone, spectrum analyzer, or computing device. However, this is not intended to be limiting and such descriptions may also be applicable to any other number of such components as well.

The power converter 302 may be an electrical circuit that changes the electric energy from one form into the desired form optimized for the specific load. Switching events of power semiconductors associated with the power converter 302 may produce acoustic noises that may be measured by the microphone 304. Particularly, the acoustic noise may be generated by the mechanical vibration caused by Lorentz force on the conductors and the magnetostrictive force on magnetic cores. This acoustic noise may provide insight into the aging of the power converter 302. This, in turn, may allow for predictions to be made regarding a potential failure of the power converter 302. While reference may primarily be made to the methods described herein being applied to a power converter, such as power converter 302, similar methods may also be applicable to any other type of electronic component as well.

The microphone 304 may be any type of device that is capable of capturing audio data. For example, the microphone 304 may be a standalone microphone or a microphone integrated into another, such as a smartphone, laptop or desktop computer, tablet, or any other type of mobile device. The microphone 304 may be placed at any distance from the power converter, as well as at any angle. Acoustic data may also be collected at various ranges and/or various angles as well. Additionally, multiple microphones 304 may be used. In such cases, the multiple microphones 304 may also be placed at various distances from the power converter and/or angles with respect to the power converter 302.

The spectrum analyzer 306 may be a device that measures and displays signal amplitude (strength) as it varies by frequency. For example, the spectrum analyzer 306 may be used to capture V/I spectrum data directly from the power converter 302. This V/I spectrum data may be compared to V/I spectrum data produced by the machine learning model associated with the computing device 308 (for example, the module(s) 316) to train the machine learning model to produce more accurate outputs.

The computing device 308 may be any type of device that may be used to perform operations in association with the methods described herein. For example, the computing device 308 may be a server, desktop or laptop computer, tablet, and/or any other type of device with processing capabilities. The computing device 308 may be located remotely from the power converter 308 (such as a remote server, for example) or may be included at the location of the power converter 302 and microphone 304.

The computing device 308 may include at least one or more processor(s) 312, memory 314, and/or one or more module(s) 316. The one or more module(s) 316, for example, may include the machine learning models that are described herein as being used to perform any of the operations associated with processing data associated with a power converter 302. For example, the one or more module(s) 316 may receive data from the microphone 304, may convert the data from the time domain to the frequency domain, may analyze the data to determine the aging of the power converter 302 and may produce an output indicating such aging and/or providing a notification to a user. The one or more module(s) 316 may also perform any other operations.

Figure 4:
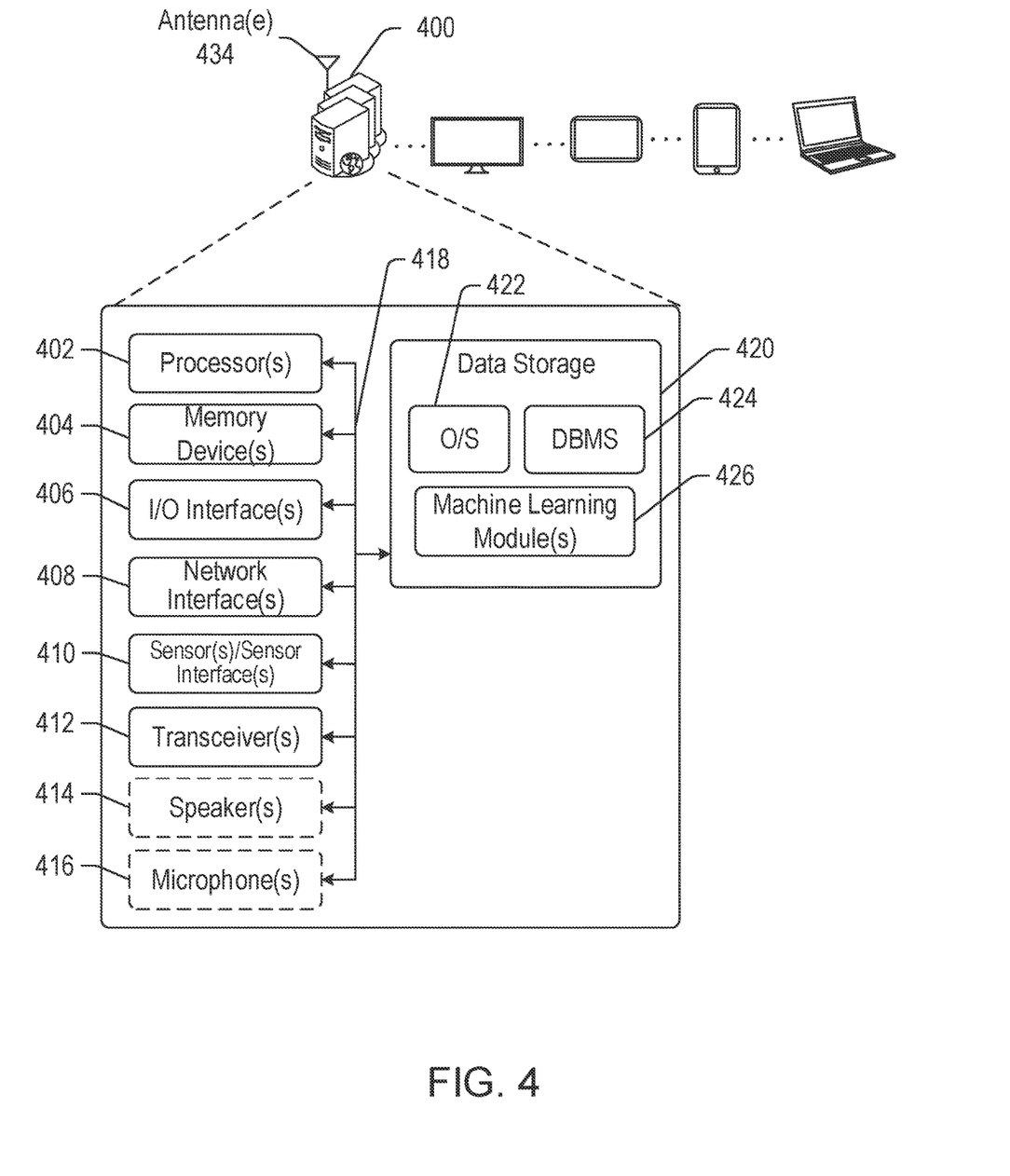
FIG. 4 illustrates an example of a computing system, in accordance with one or more embodiments of this disclosure.

In one or more embodiments, any of the components of the system 300 (for example, one or more power converters 302, one or more microphones 304, one or more spectrum analyzers 306, and/or one or more computing devices 308) may include any of the components of the machine 400 described with respect to FIG. 4. That is, as illustrated in the figure, these elements of the system 300 may include one or more processor(s) and memory, as well as at least any other elements described as being included in the machine 400. That is, although the figure may only depict a particular element of system 300 as having one or more processors, memory, and one or more modules, this may not be intended to be limiting in any way.

In one or more embodiments, any of the elements of the system 300 (for example, one or more power converters 302, one or more microphonese 304, one or more spectrum analyzers 306, and/or one or more computing devices 308, and/or any other element described with respect to FIG. 3 or otherwise) may be configured to communicate via a communications network 320. The communications network 320 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 320 may have any suitable communication range associated therewith and may include, for example, global networks (e.g., the Internet), metropolitan area networks (MANs), wide area networks (WANs), local area networks (LANs), or personal area networks (PANs). In addition, communications network 320 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

FIG. 4 is a schematic block diagram of an illustrative computing device 400 in accordance with one or more example embodiments of the disclosure. The computing device 400 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 400 may correspond to an illustrative device configuration for the devices of FIGS. 1-3.

The computing device 400 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 400 may include one or more processors (processor(s)) 402, one or more memory devices 404 (generically referred to herein as memory 404), one or more input/output (I/O) interface(s) 406, one or more network interface(s) 408, one or more sensors or sensor interface(s) 410, one or more transceivers 412, one or more optional speakers 414, one or more optional microphones 416, and data storage 420. The computing device 400 may further include one or more buses 418 that functionally couple various components of the computing device 400. The computing device 400 may further include one or more antenna(e) 434 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 418 may include at least one of a system bus, a memory bus, an address bus, or a message bus, and may permit exchange of information (e.g., data (including computer-executable code), signaling, etc.) between various components of the computing device 400. The bus(es) 418 may include, without limitation, a memory bus or a memory controller, a peripheral bus, an accelerated graphics port, and so forth. The bus(es) 418 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 of the computing device 400 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 404 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 420 may include removable storage and/or nonremovable storage including, but not limited to, magnetic storage, optical disk storage, and/or tape storage. The data storage 420 may provide nonvolatile storage of computer-executable instructions and other data. The memory 404 and the data storage 420, removable and/or nonremovable, are examples of computer-readable storage media (CRSM) as that term is used herein.

The data storage 420 may store computer-executable code, instructions, or the like that may be loadable into the memory 404 and executable by the processor(s) 402 to cause the processor(s) 402 to perform or initiate various operations. The data storage 420 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404, and may ultimately be copied to data storage 420 for nonvolatile storage.

More specifically, the data storage 420 may store one or more operating systems (O/S) 422; one or more database management systems (DBMS) 424; and one or more program module(s), applications, engines, computer-executable code, scripts, or the like such as, for example, one or more machine learning module(s) 426, one or more communication module(s) 428, one or more content scanning module(s) 430, and/or one or more prediction module(s) 432. Some or all these module(s) may be sub-module(s). Any of the components depicted as being stored in data storage 420 may include any combination of software, firmware, and/or hardware. The software and/or firmware may include computer-executable code, instructions, or the like that may be loaded into the memory 404 for execution by one or more of the processor(s) 402. Any of the components depicted as being stored in data storage 420 may support functionality described in reference to correspondingly named components earlier in this disclosure.

The data storage 420 may further store various types of data utilized by components of the computing device 400. Any data stored in the data storage 420 may be loaded into the memory 404 for use by the processor(s) 402 in executing computer-executable code. In addition, any data depicted as being stored in the data storage 420 may potentially be stored in one or more datastore(s) and may be accessed via the DBMS 424 and loaded in the memory 404 for use by the processor(s) 402 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 4, the datastore(s) may include, for example, purchase history information, user action information, user profile information, a database linking search queries and user actions, and other information.

The processor(s) 402 may be configured to access the memory 404 and execute computer-executable instructions loaded therein. For example, the processor(s) 402 may be configured to execute computer-executable instructions of the various program module(s), applications, engines, or the like of the computing device 400 to cause or facilitate various operations to be performed in accordance with one or more embodiments of the disclosure. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to functionality supported by the various program module(s) depicted in FIG. 4, the machine learning module(s) 426 may include computer-executable instructions, code, or the like that responsive to execution by one or more of the processor(s) 402 may perform functions including, but not limited to, processing of acoustic data received from a power converter to determine an aging of the power converter as described herein, and the like. For example, machine learning module(s) 426 may be the same as the one or more module(s) 316.

Referring now to other illustrative components depicted as being stored in the data storage 420, the O/S 422 may be loaded from the data storage 420 into the memory 404 and may provide an interface between other application software executing on the computing device 400 and hardware resources of the computing device 400. More specifically, the O/S 422 may include a set of computer-executable instructions for managing hardware resources of the computing device 400 and for providing common services to other application programs (e.g., managing memory allocation among various application programs). In certain example embodiments, the O/S 422 may control execution of the other program module(s) to dynamically enhance characters for content rendering. The O/S 422 may include any operating system now known or which may be developed in the future including, but not limited to, any server operating system, any mainframe operating system, or any other proprietary or non-proprietary operating system.

The DBMS 424 may be loaded into the memory 404 and may support functionality for accessing, retrieving, storing, and/or manipulating data stored in the memory 404 and/or data stored in the data storage 420. The DBMS 424 may use any of a variety of database models (e.g., relational model, object model, etc.) and may support any of a variety of query languages. The DBMS 424 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 400 is a mobile device, the DBMS 424 may be any suitable light-weight DBMS optimized for performance on a mobile device.

Referring now to other illustrative components of the computing device 400, the input/output (I/O) interface(s) 406 may facilitate the receipt of input information by the computing device 400 from one or more I/O devices as well as the output of information from the computing device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more of the antenna(e) 434 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 400 may further include one or more network interface(s) 408 via which the computing device 400 may communicate with any of a variety of other systems, platforms, networks, devices, and so forth. The network interface(s) 408 may enable communication, for example, with one or more wireless routers, one or more host servers, one or more web servers, and the like via one or more networks.

The antenna(e) 434 may include any suitable type of antenna depending, for example, on the communications protocols used to transmit or receive signals via the antenna (e) 434. Non-limiting examples of suitable antennas may include directional antennas, nondirectional antennas, dipole antennas, folded dipole antennas, patch antennas, multiple-input multiple-output (MIMO) antennas, or the like. The antenna(e) 434 may be communicatively coupled to one or more transceivers 412 or radio components to which or from which signals may be transmitted or received.

As previously described, the antenna(e) 434 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 434 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 434 may be configured to transmit or receive radio frequency signals within any suitable frequency range forming part of the unlicensed portion of the radio spectrum.

The antenna(e) 434 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 412 may include any suitable radio component(s) for—in cooperation with the antenna(e) 434—transmitting or receiving radio frequency (RF) signals in the bandwidth and/or channels corresponding to the communications protocols utilized by the computing device 400 to communicate with other devices. The transceiver(s) 412 may include hardware, software, and/or firmware for modulating, transmitting, or receiving—potentially in cooperation with any of antenna(e) 434—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 412 may further include hardware, firmware, or software for receiving GNSS signals. The transceiver(s) 412 may include any known receiver and baseband suitable for communicating via the communications protocols utilized by the computing device 400. The transceiver(s) 412 may further include a low noise amplifier (LNA), additional signal amplifiers, an analog-to-digital (A/D) converter, one or more buffers, a digital baseband, or the like.

The sensor(s)/sensor interface(s) 410 may include or may be capable of interfacing with any suitable type of sensing device such as, for example, inertial sensors, force sensors, thermal sensors, and so forth. Example types of inertial sensors may include microphones, accelerometers (e.g., MEMS-based accelerometers), gyroscopes, and so forth.

The optional speaker(s) 414 may be any device configured to generate audible sound. The optional microphone(s) 416 may be any device configured to receive analog sound input or voice data.

It should be appreciated that the program module(s), applications, computer-executable instructions, code, or the like depicted in FIG. 4 as being stored in the data storage 420 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 400, and/or hosted on other computing device(s) accessible via one or more networks, may be provided to support functionality provided by the program module(s), applications, or computer-executable code depicted in FIG. 4 and/or additional or alternate functionality. Further, functionality may be modularized differently such that processing described as being supported collectively by the collection of program module(s) depicted in FIG. 4 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 4 may be implemented, at least partially, in hardware and/or firmware across any number of devices.

It should further be appreciated that the computing device 400 may include alternate and/or additional hardware, software, or firmware components beyond those described or depicted without departing from the scope of the disclosure. More particularly, it should be appreciated that software, firmware, or hardware components depicted as forming part of the computing device 400 are merely illustrative and that some components may not be present or additional components may be provided in various embodiments. While various illustrative program module(s) have been depicted and described as software module(s) stored in data storage 420, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
receiving first acoustic data associated with a power converter, wherein the first acoustic data is captured by a microphone;
converting the first acoustic data into second acoustic data, wherein the first acoustic data is time domain data and the second acoustic data is frequency domain data;
converting the second acoustic data into a first voltage/current (V/I) spectrum;
receiving an ideal V/I spectrum for the power converter;
comparing the first V/I spectrum to the ideal V/I spectrum;
determining, by a machine learning model and based on the comparison, a remaining useful life value associated with the power converter; and
automatically sending, based on determining the remaining useful life value associated with the power converter, a signal to the power converter to shut down or modify an operational parameter of the power converter.

2. The method of claim 1, wherein comparing the first V/I spectrum to the ideal V/I spectrum further comprises determining a variation between a first gate threshold voltage associated with the first V/I spectrum and a second gate threshold voltage associated with the ideal V/I spectrum.

3. The method of claim 1, wherein the first acoustic data is produced by switching events of power semiconductors associated with the power converter.

4. The method of claim 1, further comprising:
receiving a second V/I spectrum associated with the power converter;
comparing the first V/I spectrum and the second V/I spectrum; and
training the machine learning model based on a difference between the first V/I spectrum and the second V/I spectrum.

5. The method of claim 4, wherein the second V/I spectrum is received from a spectrum analyzer.

6. The method of claim 1, wherein the microphone is associated with a device that is separate from the power converter or a standalone microphone that is separate from the power converter, wherein the microphone is placed at a distance from the power converter.

7. A system comprising:
a microphone;
a power converter;
at least one processor; and
at least one memory storing computer-executable instructions, that when executed by the at least one processor, cause the at least one processor to:
receive first acoustic data associated with the power converter, wherein the first acoustic data is captured by the microphone;
convert the first acoustic data into second acoustic data, wherein the first acoustic data is time domain data and the second acoustic data is frequency domain data;
convert the second acoustic data into a first voltage/current (V/I) spectrum;
receive an ideal V/I spectrum for the power converter;
compare the first V/I spectrum to the ideal V/I spectrum;
determine, by a machine learning model and based on the comparison, a remaining useful life value associated with the power converter; and
automatically send, based on determining the remaining useful life value associated with the power converter, a signal to the power converter to shut down or modify an operational parameter of the power converter.

8. The system of claim 7, wherein comparing the first V/I spectrum to the ideal V/I spectrum further comprises determining a variation between a first gate threshold voltage associated with the first V/I spectrum and a second gate threshold voltage associated with the ideal V/I spectrum.

9. The system of claim 7, wherein the first acoustic data is produced by switching events of power semiconductors associated with the power converter.

10. The system of claim 7, wherein the computer-executable instructions further cause the at least one processor to:
receiving a second V/I spectrum associated with the power converter;
comparing the first V/I spectrum and the second V/I spectrum; and
training the machine learning model based on a difference between the first V/I spectrum and the second V/I spectrum.

11. The system of claim 10, wherein the second V/I spectrum is received from a spectrum analyzer.

12. The system of claim 7, wherein the microphone is associated with a device that is separate from the power converter or a standalone microphone that is separate from the power converter, wherein the microphone is placed at a distance from the power converter.

13. A non-transitory computer-readable medium storing computer-executable instructions, that when executed by at least one processor, cause the at least one processor to:
receive first acoustic data associated with a power converter, wherein the first acoustic data is captured by a microphone;
convert the first acoustic data into second acoustic data, wherein the first acoustic data is time domain data and the second acoustic data is frequency domain data;
convert the second acoustic data into a first voltage/current (V/I) spectrum;
receive an ideal V/I spectrum for the power converter;
compare the first V/I spectrum to the ideal V/I spectrum;
determine, by a machine learning model and based on the comparison, a remaining useful life value associated with the power converter; and
automatically send, based on determining the remaining useful life value associated with the power converter, a signal to the power converter to shut down or modify an operational parameter of the power converter.

14. The non-transitory computer-readable medium of claim 13, wherein comparing the first V/I spectrum to the ideal V/I spectrum further comprises determining a variation between a first gate threshold voltage associated with the first V/I spectrum and a second gate threshold voltage associated with the ideal V/I spectrum.

15. The non-transitory computer-readable medium of claim 13, wherein the first acoustic data is produced by switching events of power semiconductors associated with the power converter.

16. The non-transitory computer-readable medium of claim 13,
wherein the computer-executable instructions further cause the at least one processor to:
receiving a second V/I spectrum associated with the power converter;
comparing the first V/I spectrum and the second V/I spectrum; and
training the machine learning model based a difference between the first V/I spectrum and the second V/I spectrum.

17. The non-transitory computer-readable medium of claim 16, wherein the second V/I spectrum is received from a spectrum analyzer.

\* \* \* \* \*